United States Patent
Yanagiwara

(10) Patent No.: US 10,070,015 B2
(45) Date of Patent: Sep. 4, 2018

(54) IMAGE READING APPARATUS, IMAGE READING METHOD AND STORAGE MEDIUM FOR SHADING CORRECTION ACCOUNTING FOR DARK CURRENT INFLUENCE

(71) Applicant: CANON KABUSHIKI KAISHA, Tokyo (JP)

(72) Inventor: Yuichi Yanagiwara, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/610,250

(22) Filed: May 31, 2017

(65) Prior Publication Data
US 2017/0353629 A1  Dec. 7, 2017

(30) Foreign Application Priority Data
Jun. 7, 2016 (JP) .................................. 2016-113487

(51) Int. Cl.
| | | |
|---|---|---|
| *H04N 1/00* | (2006.01) | |
| *H04N 1/60* | (2006.01) | |
| *G03G 15/01* | (2006.01) | |
| *H04N 1/407* | (2006.01) | |

(52) U.S. Cl.
CPC ....... *H04N 1/6027* (2013.01); *G03G 15/0131* (2013.01); *H04N 1/00013* (2013.01); *H04N 1/00015* (2013.01); *H04N 1/407* (2013.01)

(58) Field of Classification Search
None
See application file for complete search history.

(56) References Cited

U.S. PATENT DOCUMENTS

| | | | |
|---|---|---|---|
| 8,130,421 B2 | 3/2012 | Kituchi | ......................... 358/461 |
| 2011/0019036 A1* | 1/2011 | Okado | ................... H04N 5/361 |
| | | | 348/243 |
| 2012/0105688 A1* | 5/2012 | Kita | ....................... H04N 5/359 |
| | | | 348/242 |

FOREIGN PATENT DOCUMENTS

JP  4892447  3/2012

* cited by examiner

*Primary Examiner* — Barbara Reinier
(74) *Attorney, Agent, or Firm* — Fitzpatrick, Cella, Harper & Scinto

(57) ABSTRACT

An image reading apparatus according to an embodiment of the present invention includes: an image sensor to read a document; a movement unit configured to relatively move the document and the image sensor by using a motor as a drive source; an output unit configured to output data of a plurality of colors based on accumulated light-receiving signals by accumulating the light-receiving signals from the image sensor for each color in order for each line in a direction of the movement based on an encoder pulse output from an encoder in accordance with rotation of the motor; and a correction unit configured to perform shading correction for each piece of data of the plurality of colors output by the output unit by using a correction value to correct influence on data of the plurality of colors due to a dark current in the image sensor based on shading data.

19 Claims, 13 Drawing Sheets

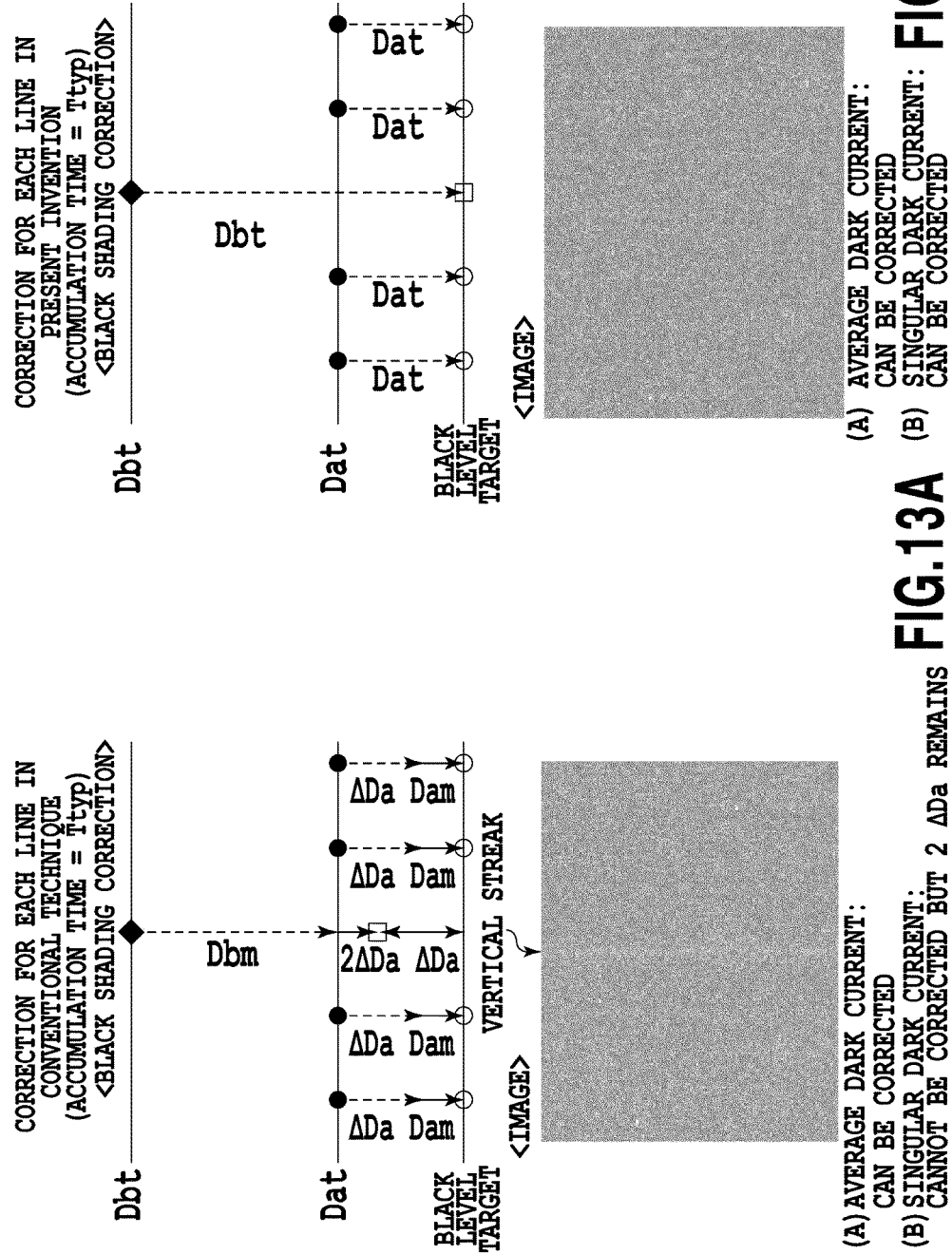

IMAGE READING APPARATUS, IMAGE READING METHOD AND STORAGE MEDIUM FOR SHADING CORRECTION ACCOUNTING FOR DARK CURRENT INFLUENCE

BACKGROUND OF THE INVENTION

Field of the Invention

The present invention relates to an image reading apparatus that sequentially performs image processing for image data read by a reading device, an image reading method, and a storage medium.

Description of the Related Art

In recent years, in a multi function printer (MFP) having the copy function and the FAX function, in addition to the print function, as a drive source of an image sensor that reads an image of a document, a DC (Direct Current) motor is employed. The reason is that the DC motor is superior to a conventional stepping motor in silentness at the time of conveyance of an image sensor in a flat bed scanner and at the time of conveyance of a document in a sheet feed scanner.

On the other hand, in the DC motor, the rotation speed fluctuates due to cogging torque and the like, and therefore, the accumulation time of a signal in an image sensor also fluctuates. In the case where the accumulation time of a signal fluctuates, in general, black level data changes due to a dark current in the image sensor. Further, in the case where the lighting time of the sensor light source is also affected and changes, white level data also changes.

In order to deal with the change in black level data and white level data such as this, correction of shading data is performed. For example, in the technique described in Japanese Patent No. 4892447, the amount of fluctuations in the accumulation time at the time of execution of a scan for that at the time of acquisition of shading data is measured. Then, the amount of fluctuations in black level data and white level data for the amount of fluctuations in the accumulation time is calculated by a linear function calculation and the shading data is corrected by taking the amount of fluctuations as a correction value.

However, in the technique described in Japanese Patent No. 4892447, the shading data is corrected by average data for each line. Because of this, in the singular pixel, the amount of fluctuations in black level data is different from the amount of correction of shading data that is the average of one line, and therefore, it is not possible to correct the shading data completely. In the following, by using FIG. 1 and FIG. 2, the shading data correction by the average data for each line is explained.

FIG. 1 shows black shading data acquired in an accumulation time Tmin that is necessary at the very least for signal accumulation and pixel output of an image sensor. The ● point indicates (A) black level data due to a dark current that occurs averagely in all the pixels. The ◆ point indicates (B) black level data due to a dark current that occurs in the singular pixel. In the black shading data to correct black level data to a black level target, (A) the black level data due to a dark current that occurs averagely in all the pixels is taken to be Dam and (B) the black level data due to a dark current that occurs in the singular pixel is taken to be Dbm. Here, it is assumed that the black level data due to a dark current that occurs averagely in all the pixels is the same value in all the pixels. Further, it is assumed that the amount of the dark current that occurs in the singular pixel is three times the amount of the dark current that occurs averagely in all the pixels (e.g., Dbm=3×Dam). Furthermore, it is assumed that the average value of one line of the black level data is the same value as that of the black level data due to a dark current that occurs averagely in all the pixels.

FIG. 2 shows correction for each line of black shading data acquired in an accumulation time Ttyp. (A) The black level data due to a dark current that occurs averagely in all the pixels is taken to be Dat and (B) the black level data due to a dark current that occurs in the singular pixel is taken to be Dbt. Here, a correction amount ΔDa of the black shading data to correct the black level data to the black level target is Dat−Dam, and therefore, it is possible to express (A) the dark current that occurs averagely in all the pixels and (B) the dark current that occurs in the singular pixel as follows.

(A) the dark current that occurs averagely in all the pixels: Dat−Dam−ΔDa=0

(B) the dark current that occurs in the singular pixel: Dbt−Dbm−ΔDa=3Dat−3Dam−ΔDa=2ΔDa That is, in the accumulation time Ttyp, (A) the dark current that occurs averagely in all the pixels can be corrected, but (B) the dark current that occurs in the singular pixel cannot be corrected completely but 2ΔDa is left. Consequently, in a read image, the portion obtained by scanning the singular pixel appears as a vertical streak.

Japanese Patent No. 4892447 also describes the technique to correct black shading data for each pixel. In this case, the amount of correction is calculated for each pixel, and therefore, it is possible to correct the black shading data even in the singular pixel. FIG. 3 shows correction for each pixel of the black shading data acquired in the accumulation time Ttyp. In the case where it is assumed that the black level data due to a dark current is the same as that in FIG. 2, at the ◆ point, (B) the black level data due to a dark current that occurs in the singular pixel can be corrected by ΔDb (=3ΔDa). However, the correction value of the black shading data is calculated for each pixel and stored, and therefore, a large amount of memory and much processing time are required and there is a possibility that performance of the product is affected.

SUMMARY OF THE INVENTION

The image reading apparatus according to an embodiment of the present invention includes: an image sensor to read a document; a movement unit configured to relatively move the document and the image sensor by using a motor as a drive source; an output unit configured to output data of a plurality of colors based on accumulated light-receiving signals by accumulating the light-receiving signals from the image sensor for each color in order for each line in a direction of the movement based on an encoder pulse output from an encoder in accordance with rotation of the motor; and a correction unit configured to perform shading correction for each piece of data of the plurality of colors output by the output unit by using a correction value to correct influence on data of the plurality of colors due to a dark current in the image sensor based on shading data. The output unit accumulates the light-receiving signal for predetermined color of the plurality of colors from timing based on the encoder pulse until end timing determined asynchronously with the encoder pulse so that an accumulation time becomes a predetermined time, and accumulates the light-receiving signals for other color different from the predetermined color of the plurality of colors from start timing based on the encoder pulse until end timing determined in synchronization with the encoder pulse. The correction unit corrects data of the predetermined color and data of the other color independently of each other and performs correction of data of the other color by using a correction value corresponding to the end timing determined in synchronization with the encoder pulse.

Further features of the present invention will become apparent from the following description of exemplary embodiments with reference to the attached drawings.

BRIEF DESCRIPTION OF THE DRAWINGS

FIG. 13A is a diagram explaining black shading correction according to a conventional technique; and FIG. 13B is a diagram explaining black shading correction according to the present invention.

DESCRIPTION OF THE EMBODIMENTS

In the following, embodiments of the present invention are explained in detail with reference to the drawings. The embodiments explained below are merely exemplary and not intended to limit the present invention.

Figure 4:
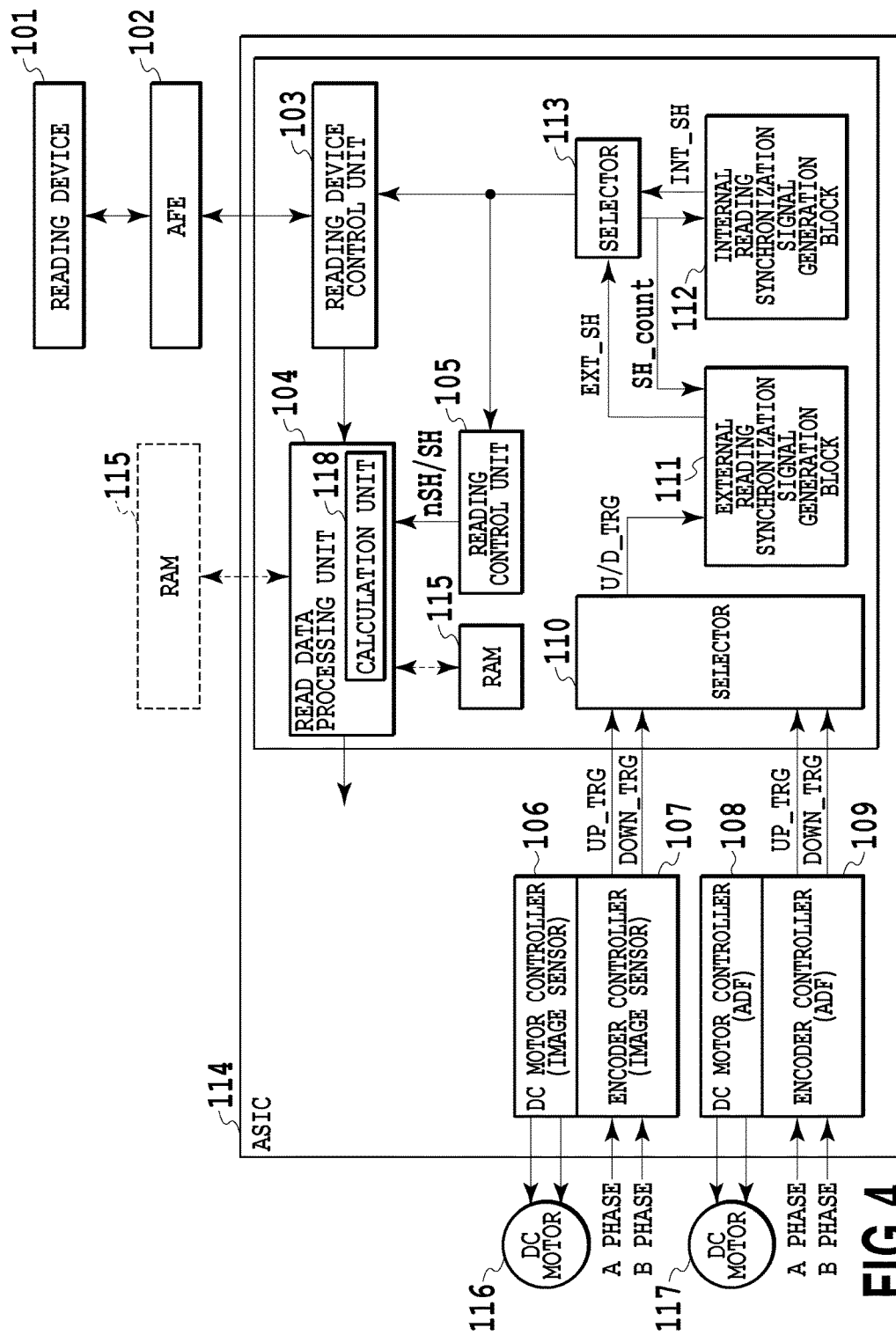
FIG. 4 is a block diagram showing a configuration of an image reading apparatus in an embodiment of the present invention.

FIG. 4 shows a configuration of an image reading apparatus in an embodiment of the present invention. The present image reading apparatus is able to read a document by relatively moving an image sensor and the document by using a motor as a drive source.

A reading device 101 includes a plurality of light-receiving pixels, such as a CCD (Charge Coupled Device) and a CIS (Contact Image Sensor), configured to photoelectrically convert reflected light from a document and to output an analog signal of RGB. The reading device 101 is a linear image sensor in which the light-receiving pixels are arranged in one line. An AFE (Analog Front End) device 102 is configured so as to A/D-convert an analog signal output from the reading device 101 into a digital signal.

A reading device control unit 103 outputs a control signal to the reading device 101 and the AFE device 102. The reading device control unit 103 takes in an analog signal of RGB from the reading device 101 as a digital signal via the AFE device 102, rearranges the data, and transfers the digital signal to a read data processing unit 104 configured to perform packing and the like as image data. Further, the reading device control unit 103 performs light adjustment control of a sensor light source, feedback PWM (Pulse Width Modulation) control based on an input image signal, and so on.

The read data processing unit 104 performs shading correction in synchronization with a reading synchronization signal for each line of the reading resolution or for each accumulation time of an image sensor, which is generated in synchronization with an output signal from an encoder controller, to be described later, or an internal timer. Further, the read data processing unit 104 has a calculation unit 118. The calculation unit 118 generates a calibration curve from shading data in two or more arbitrary accumulation times. Further, the calculation unit 118 measures an amount of fluctuations in the accumulation time that takes the accumulation time corresponding to the target value of the motor speed (target motor speed) during a scan as a reference and calculates the fluctuations in the shading data for the amount of fluctuations in the accumulation time as a correction value of the shading data.

A reading control unit 105 performs control of the start and end of taking in (reading) of image data.

A first DC motor controller 106 for an image sensor performs drive control of a first DC motor 116 for an image sensor. A first encoder controller 107 for an image sensor receives pulses in different phases, i.e., an A phase and a B phase, in accordance with the rotation of the first DC motor 116. A second DC motor controller 108 for an ADF (Auto Document Feeder), not shown schematically, performs drive control of a second DC motor 117 for ADF drive. A second encoder controller 109 for an ADF performs the same control as that of the first encoder controller 107. That is, the second encoder controller 109 receives pulses in different phases, i.e., the A phase and the B phase, in accordance with the rotation of the second DC motor 117. As a pulse generation mechanism, in general, a rotary encoder is used.

Each of the DC motor controllers 106 and 108 outputs an Enable signal and a Phase signal having information on the speed and the rotation direction to the DC motors 116 and 117 and performs feedback control of the DC motor in accordance with processing of the encoder controllers 107 and 109. The DC motor 116 is a drive source to cause the image sensor to scan a document placed on a document table. The DC motor 117 is a drive source of the auto document feeder (ADF), not shown schematically. The ADF is a mechanism to move a document relative to the image sensor. A selector 110 switches DC motor control between two of the DC motor 116 and the DC motor 117. This shows an example in which selection is enabled to reduce the circuit scale. In the case where the DC motor control unit is the same including the encoder controller, a configuration is also considered in which selection is made on the further outside. The example in FIG. 4 shows a configuration having a function to produce an output by selecting the normal rotation direction or the reverse rotation direction of the phase from the encoder pulse. In the case where only one DC motor is controlled, the selector may be omitted.

An external reading synchronization signal generation block 111 configured to generate a reading synchronization signal from an external trigger counts the number of pulses from information on a normal rotation phase pulse, a reverse rotation phase pulse, one edge, and both edges. The external reading synchronization signal generation block 111 generates a reference external reading synchronization signal (EXT_SH) that forms one line or a plurality of lines of the reading resolution based on the count value. An internal reading synchronization signal generation block 112 generates an internal synchronization signal (INT_SH) as a reading synchronization signal of an image sensor from a timer, not shown schematically, and a synchronization signal corresponding to one period of signal accumulation and signal output of the image sensor.

A selector 113 counts the external synchronization signal (EXT_SH) generated based on an encoder signal and the internal synchronization signal (INT_SH) generated from the internal timer by a reading synchronization signal (SH) counter, not shown schematically. The selector 113 selects the reading synchronization signal (SH) of the image sensor in accordance with the count. The present image reading apparatus controls the selector 113 so that the internal synchronization signal (INT_SH) is internally multiplied in the section between the external synchronization signal (EXT_SH) and the next external synchronization signal (EXT_SH) during a scan. The present image reading apparatus has an external synchronization SH generation mode of generating the reading synchronization signal (SH) of the image sensor by controlling the selector 113 as described above. As an example of internal multiplication by 2 or a larger number, there is a case where multiplication by 3 is performed at the time of outputting Rch, Gch, and Bch for each accumulation period of the image sensor in color reading by the CIS, and further, the internal multiplication by 2 or a larger number is used to add a dummy accumulation period for motor drive speed adjustment at the time of occurrence of S/S. Further, the present image reading apparatus has an internal synchronization SH generation mode of generating the reading synchronization signal (SH) of the image sensor by controlling the selector 113 so that only the internal synchronization signal (INT_SH) is generated in the case where only the reading device 101 is driven. The internal synchronization SH generation mode is used at the time of shading data acquisition, for dummy reading to reset residual charges in the photodiode of the image sensor, and so on.

A RAM 115 is a memory to store normal shading data and a plurality of pieces of shading data for correction for each pixel. It may also be possible to configure the RAM 115 as a built-in memory by an SRAM and the like within the ASIC 114 or to configure as an external memory by a DRAM and the like.

In the following, the timing control at the time of a scan and shading data acquisition in the present image reading apparatus is explained. It is assumed that as the reading device 101, a CIS (Contact Image Sensor) is used.

Figure 5:
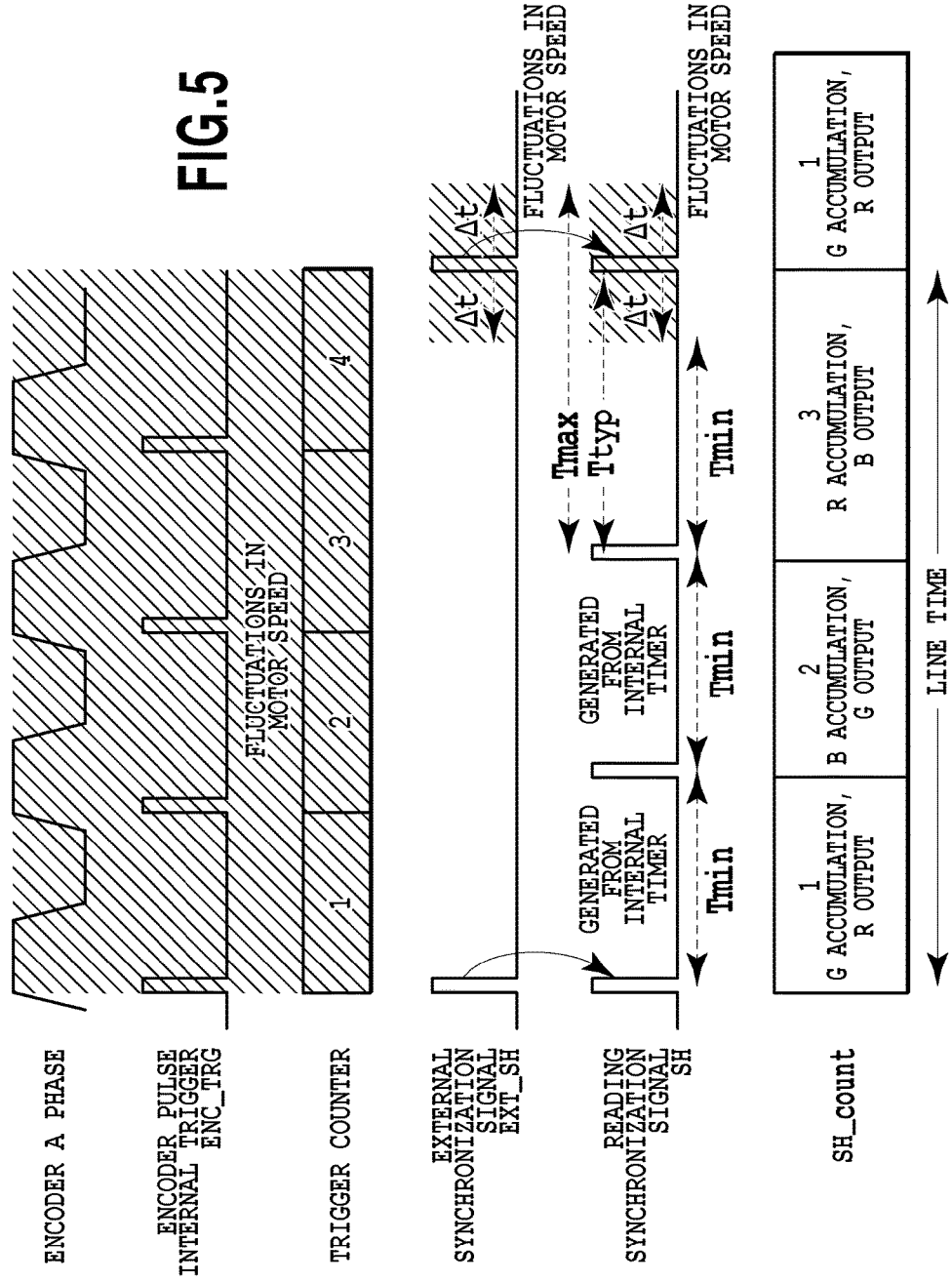
FIG. 5 is a diagram showing a timing chart at the time of a scan in a color mode in an embodiment of the present invention.

FIG. 5 shows a timing chart at the time of a scan in the color mode of the image reading apparatus in the present embodiment. At the time of this scan, the reading synchronization signal (SH) is generated in the external synchronization SH generation mode. An encoder A phase (B phase) represents an encoder signal output that is input to the encoder controllers 107 and 109 in FIG. 4. For example, in the case of one edge sampling of the rise in the encoder A phase shown in FIG. 5, the rise is filtered by the encoder controller and after noise is removed, output as an encoder pulse ENC_TRG. A trigger counter (TRG_counter) counts the encoder pulse ENC_TRG. In the present embodiment, by counting the encoder pulse ENC_TRG from 1 to 4, the reference external reading synchronization signal (EXT_SH) that forms one line of the sub scanning reading resolution is generated. Here, the sub scanning refers to scanning in the direction in which the reading device is moved or the direction in which a reading-target document is conveyed.

At the time of reading in the color mode, the LEDs of the reading device 101 are turned on in the order of R, G, and B, and therefore, one line of the reading resolution is made up of three periods of Rch (R channel), Gch (G channel), and Bch (B channel) in the accumulation period of the image sensor. For example, in the case where the external reading synchronization signal (EXT_SH) is input as the start of one line in the reading resolution, the selector 113 resets SH_count to 1.

In the section where SH_count=1, the reading device control unit 103 turns on the LED of Gch, and the image sensor accumulates the signal of Gch and outputs the data of Rch accumulated one period before. The internal reading synchronization signal generation block 112 generates the internal reading synchronization signal (INT_SH) when the accumulation time Tmin at the time of shading data acquisition has elapsed after the external reading synchronization signal (EXT_SH) is input. The selector 113 selects the internal reading synchronization signal (INT_SH) as the reading synchronization signal (SH) and increments SH_count to 2.

In the section where SH_count=2, the reading device control unit 103 turns on the LED of Bch, and the image sensor accumulates the signal of Bch and outputs the data of Gch accumulated one period before. The internal reading synchronization signal generation block 112 generates the internal reading synchronization signal (INT_SH) when the accumulation time Tmin at the time of shading data acquisition has elapsed after generating the internal reading synchronization signal (INT_SH). The selector 113 selects the internal reading synchronization signal (INT_SH) as the reading synchronization signal (SH) and increments SH_count to 3.

In the section where SH_count=3, the reading device control unit 103 turns on the LED of Rch, and the image sensor accumulates the signal of Rch and outputs the data of Bch accumulated one period before. The external reading synchronization signal generation block 111 generates the external synchronization signal (EXT_SH) of the next line. In the case where the external synchronization signal (EXT_SH) of the next line is input from the external reading synchronization signal generation block 111, the selector 113 selects the external reading synchronization signal (EXT_SH) as the reading synchronization signal (SH) and resets SH_count to 1.

The accumulation time Tmin is the minimum or reference accumulation time necessary for signal accumulation and signal output of the image sensor.

Figure 6:
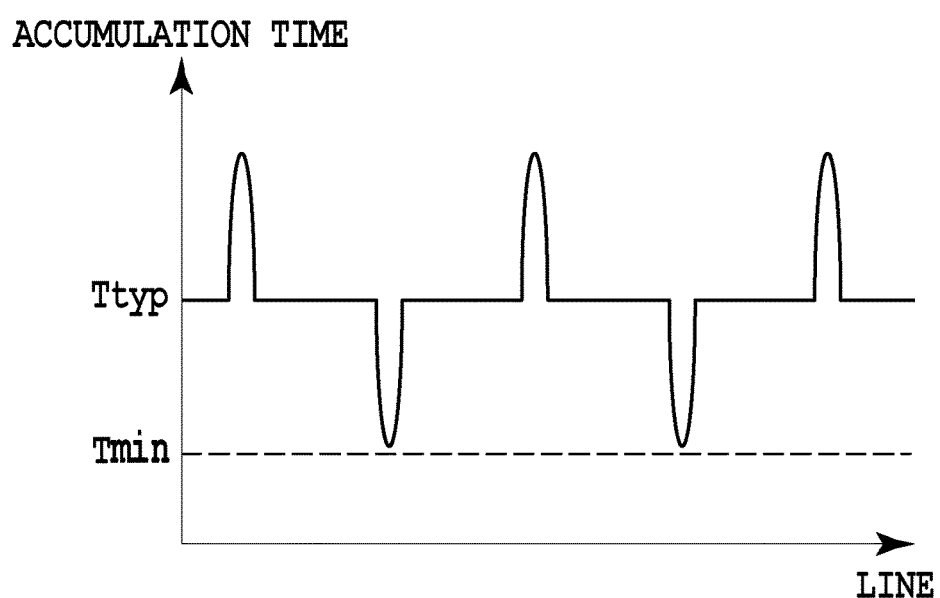
FIG. 6 is a diagram showing a change in a reading synchronization signal for fluctuations in motor speed in an embodiment of the present invention.

Further, the motor speed fluctuates instantaneously due to cogging that occurs periodically, and therefore, a reading time (LineTime) of one line of the reading resolution also fluctuates synchronously. For example, in the case where LineTime has the characteristics of fluctuating with Δt at the maximum, the image reading apparatus in the present embodiment controls the motor speed so that the accumulation time of Rch (SH_count=3) does not fall below Tmin. For example, the image reading apparatus performs servo control of the motor drive so as to give a margin by setting the average accumulation time of Rch to Ttyp (Ttyp>Tmin+ Δt). As shown in FIG. 6, in the present image reading apparatus, it is premised that the accumulation time of Rch is kept at Ttyp on the line other than the line where cogging has occurred by the servo control and the accumulation time of Rch is Ttyp±Δt on the line where cogging has occurred.

Here, Δt depends on the motor speed and the characteristics of the motor cogging torque. In general, the slower the motor speed, the larger Δt becomes. The cogging period depends on the motor structure and the number of times of occurrence of cogging per rotation of the motor is determined. The servo control is the already-known technique, and therefore, explanation is omitted in the present specification.

Figure 7:
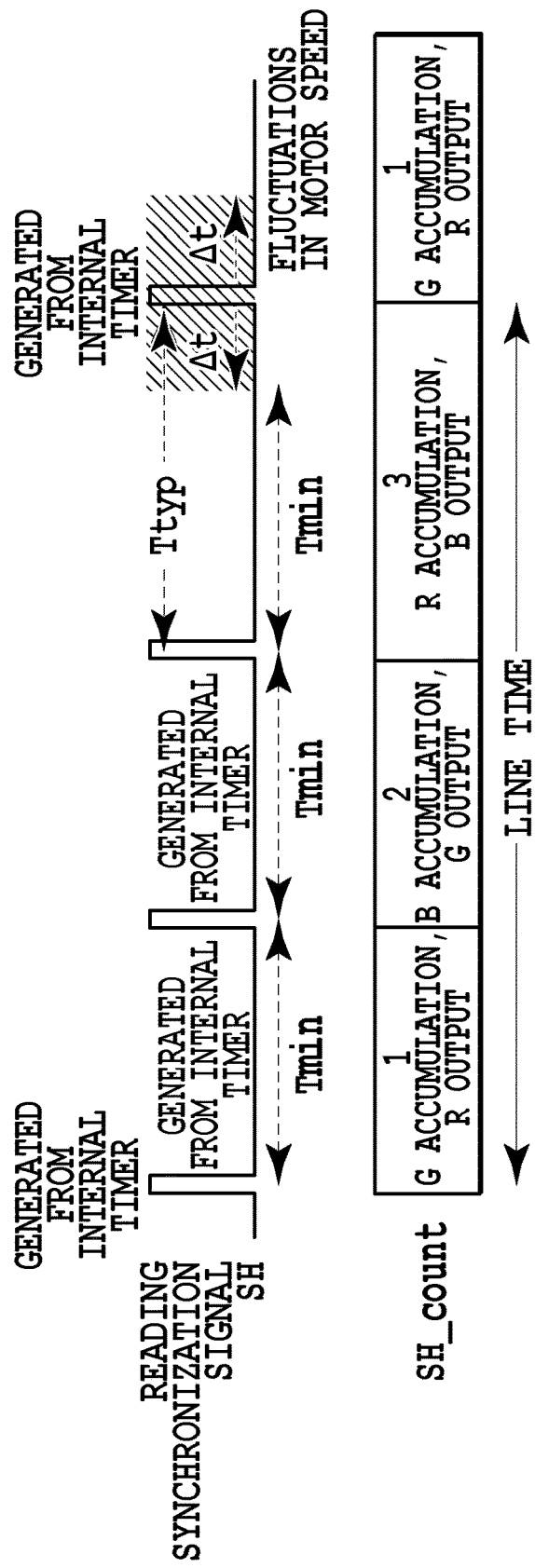
FIG. 7 is a diagram showing a timing chart at the time of shading data acquisition in a color mode in an embodiment of the present invention.

FIG. 7 shows a timing chart at the time of shading data acquisition in the color mode of the image reading apparatus in the present embodiment. At the time of shading data acquisition, the reading synchronization signal (SH) is generated in the internal synchronization SH generation mode.

In the case where the internal reading synchronization signal (INT_SH) is input as the start of one line in the reading resolution, the selector 113 resets SH_count to 1.

In the section where SH_count=1, the reading device control unit 103 turns on the LED of Gch, and the image sensor accumulates the signal of Gch and outputs the data of Rch accumulated one period before. The internal reading synchronization signal generation block 112 generates the internal reading synchronization signal (INT_SH) when the accumulation time Tmin at the time of shading data acquisition has elapsed after the internal reading synchronization signal (INT_SH) is input. The selector 113 selects the internal reading synchronization signal (INT_SH) as the reading synchronization signal (SH) and increments SH_count to 2.

In the section where SH_count=2, the reading device control unit 103 turns on the LED of Bch, and the image sensor accumulates the signal of Bch and outputs the data of Gch accumulated one period before. The internal reading synchronization signal generation block 112 generates the internal reading synchronization signal (INT_SH) when the accumulation time Tmin at the time of shading data acquisition has elapsed after generating the internal reading synchronization signal (INT_SH). The selector 113 selects the internal reading synchronization signal (INT_SH) as the reading synchronization signal (SH) and increments SH_count to 3.

In the section where SH_count=3, the reading device control unit 103 turns on the LED of Rch, and the image sensor accumulates the signal of Rch and outputs the data of Bch accumulated one period before. The internal reading synchronization signal generation block 112 generates the internal reading synchronization signal (INT_SH) when the accumulation time Ttyp at the time of shading data acquisition has elapsed after generating the internal reading synchronization signal (INT_SH). The selector 113 selects the internal reading synchronization signal (INT_SH) as the reading synchronization signal (SH) and resets SH_count to 1.

At the time of black shading data acquisition, the LED is turned off in all the color channels and signal accumulation is performed.

In this manner, only Rch takes Ttyp as a reference as the accumulation time at the time of black shading data acquisition. By doing so, on the line where the accumulation time of Rch during a scan extends to Ttyp (i.e., all the lines not affected by cogging) due to encoder synchronization, it is possible to perform black shading correction. That is, according to the present embodiment, in the case where the accumulation time of part of the channels fluctuates in synchronization with the fluctuations in the motor speed, it is possible to control the accumulation time at the time of shading data acquisition independently of the other channels.

Figure 1:
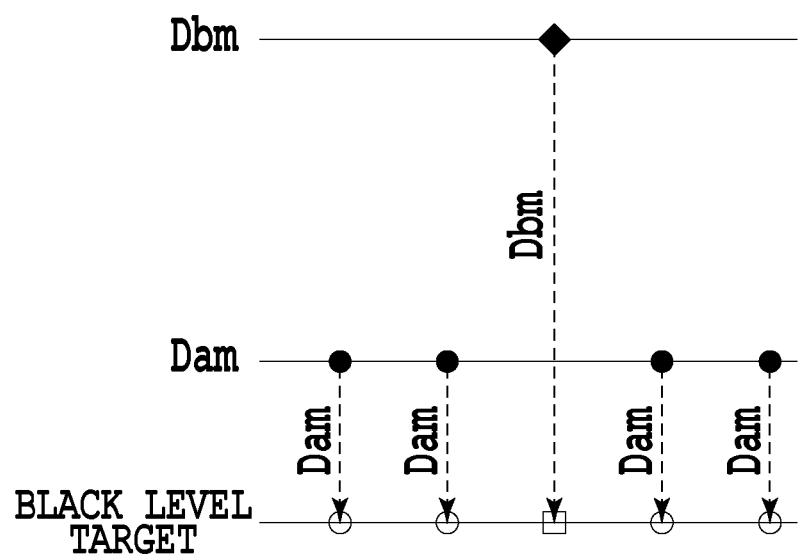
FIG. 1 is a diagram showing black shading data acquired in an accumulation time Tmin.
Figure 2:
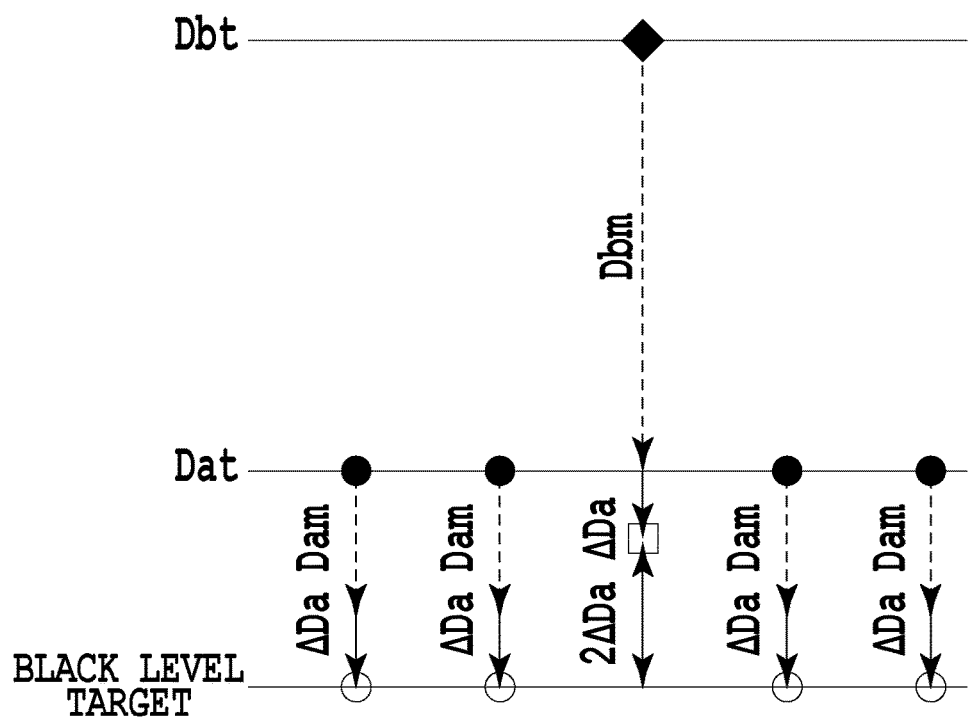
FIG. 2 is a diagram explaining correction for each line of black shading data acquired in an accumulation time Ttyp.
Figure 3:
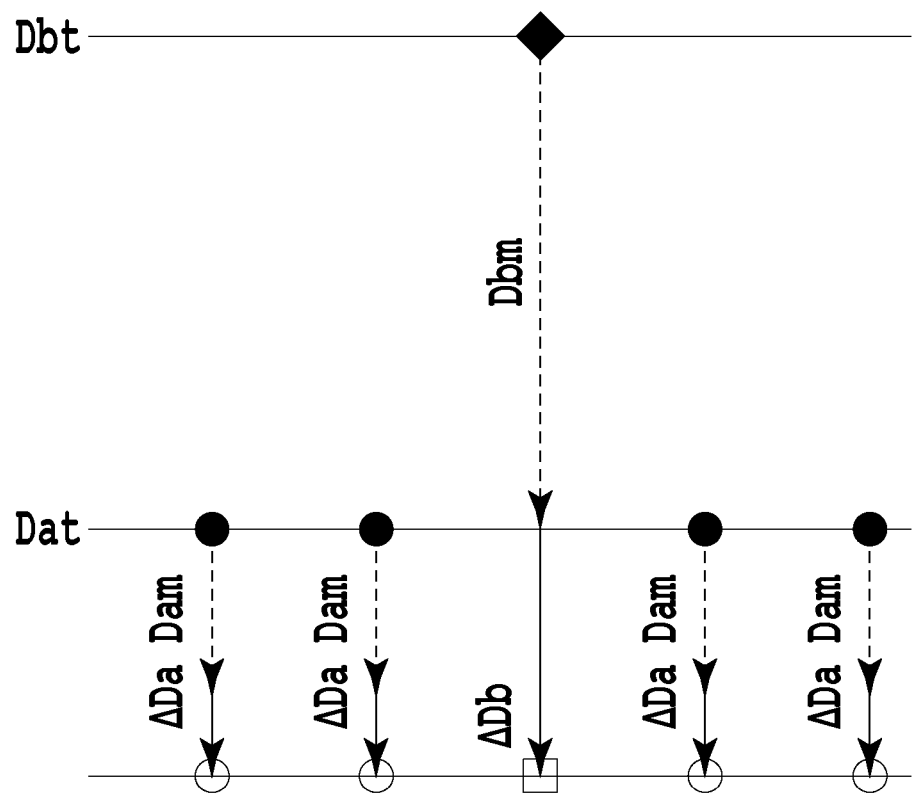
FIG. 3 is a diagram explaining correction for each pixel of the black shading data acquired in the accumulation time Ttyp.
Figure 8:
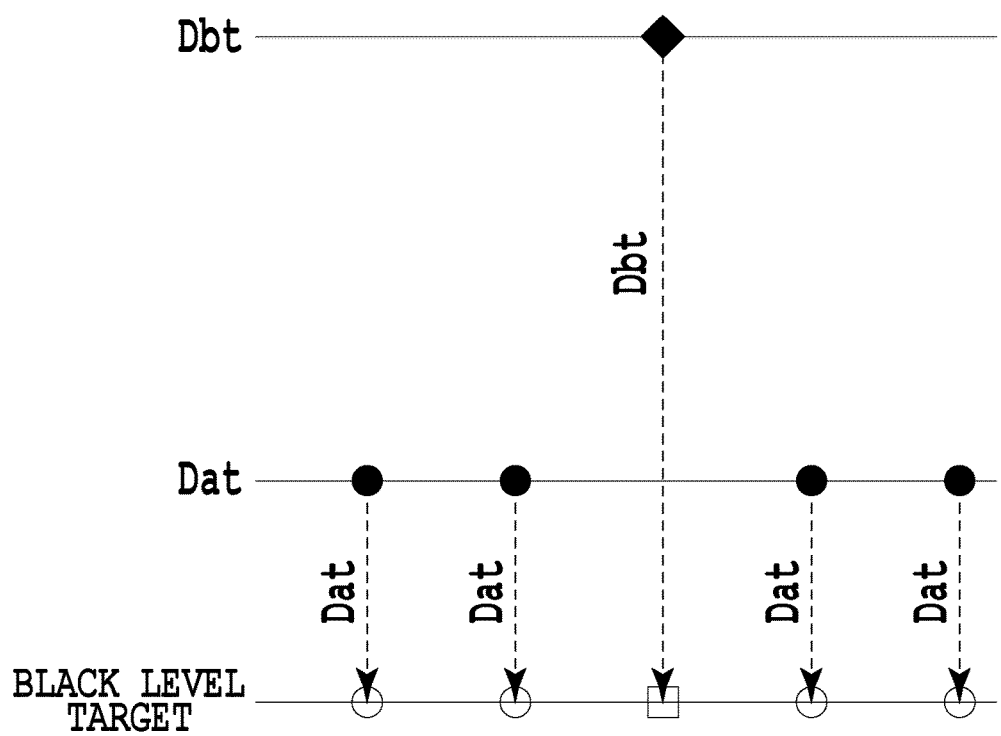
FIG. 8 is a diagram showing the black shading data in the accumulation time Ttyp in an embodiment of the present invention.

For example, FIG. 8 shows the black shading correction in the case where the accumulation time is taken to be Ttyp as is taken by Rch shown in FIG. 7. The ● point indicates (A) the black level data due to a dark current that occurs averagely in all the pixels. The ◆ point indicates (B) the black level data due to a dark current that occurs in the singular pixel. In the black shading data to correct the black level data to the black level target, (A) the black level data due to a dark current that occurs averagely in all the pixels is taken to be Dat and (B) the black level data due to a dark current that occurs in the singular pixel is taken to be Dbt. Consequently, on the line where the accumulation time during a scan is Ttyp, (A) the black level data due to a dark current that occurs averagely in all the pixels can be corrected by Dat and (B) the black level data due to a dark current that occurs in the singular pixel can also be corrected by Dbt. Consequently, it is possible to match both pieces of black level data of (A) and (B) with the black level target. That is, it is possible to correct (B) the black level data due to a dark current that occurs in the singular pixel, which cannot be corrected by the black shading with the accumulation time Tmin as a reference as shown in FIG. 2.

In the following, an example is explained in which black and white shading data for each light-receiving pixel is acquired and shading data is corrected by employing the average value thereof. That is, in the present embodiment, the correction value of the shading data is calculated by using the average data of a plurality of light-receiving pixels that the image sensor has. Further, the correction value of the shading data is calculated in a plurality of color channels (RGB). This scan is as shown in FIG. 5 and the timing at the time of shading data acquisition is as shown in FIG. 7.

Figure 9:
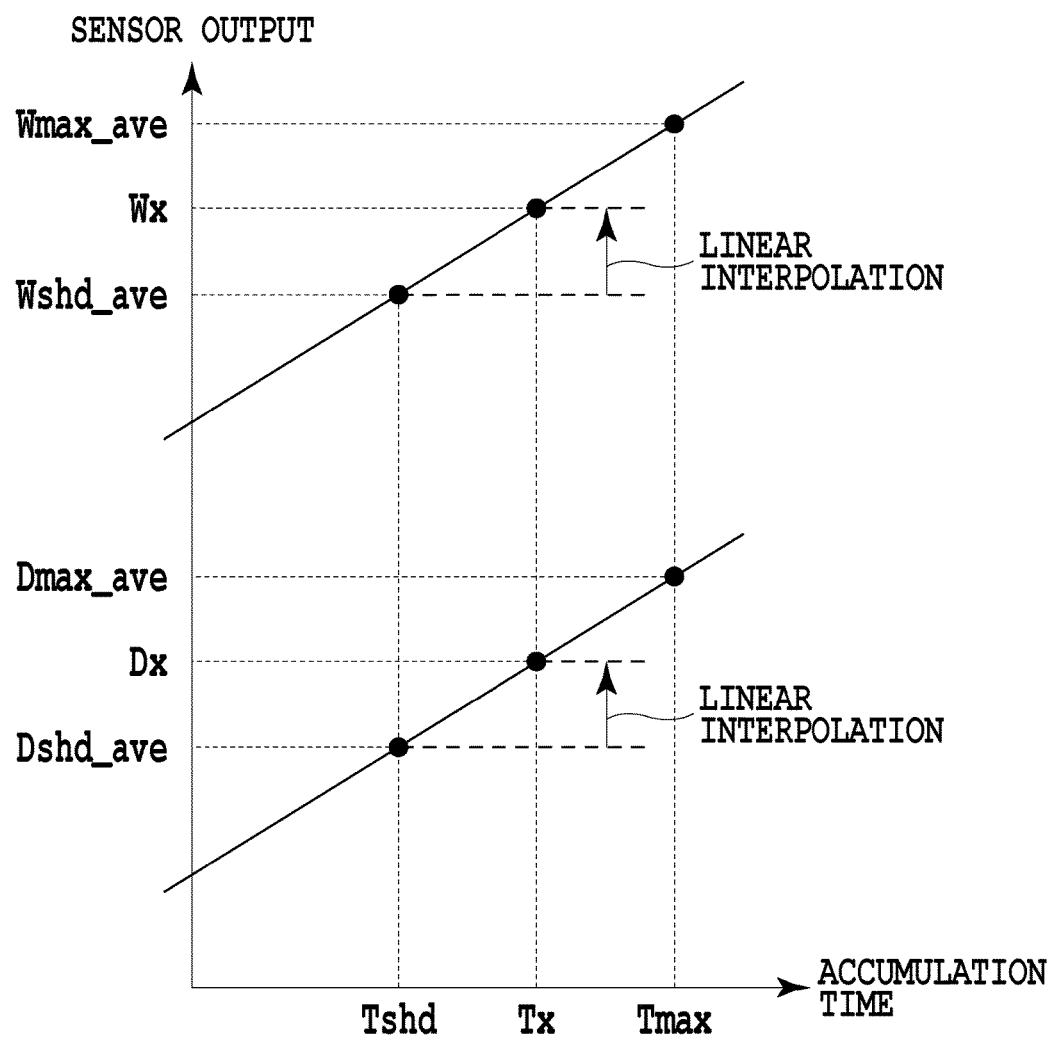
FIG. 9 is a diagram showing a relationship between the accumulation time, the average for each line of an image sensor of black and white shading data, and linear interpolation in an embodiment of the present invention.

FIG. 9 is a diagram showing a relationship between the accumulation time, the average for each line of the black and white shading data, and the linear interpolation in the present embodiment. Here, the accumulation time at the time of shading data acquisition is taken to be Tshd, the white shading data corresponding to Tshd to be Wshd, and the black shading data corresponding to Tshd to be Dshd. Further, the maximum accumulation time is taken to be Tmax, the white shading data corresponding to Tmax to be Wmax, and the black shading data corresponding to Tmax to be Dmax. FIG. 9 shows that those accumulation times Tshd and Tmax are set and shading data corresponding to an arbitrary accumulation time Tx is obtained by a linear function from each piece of the shading data Dshd, Dmax, Wshd, and Wmax.

In the present embodiment, the line average value of shading data is stored. The black shading data Dshd and the white shading data Wshd corresponding to the reference accumulation time Tshd are acquired for the resolution in accordance with the reading mode. The acquired shading data may be stored in a built-in memory or an external memory in the compressed form for each light-receiving pixel. The accumulation time Tmax is set to an accumulation time that becomes a value of the maximum value of the accumulation time that fluctuates by the fluctuations in the motor speed or more. The shading data for a plurality of accumulation times is acquired by activating the internal timer or the external synchronization signal. The black shading data Dmax and the white shading data Wmax corresponding to the accumulation time Tmax are also acquired for valid pixels x of the resolution in accordance with the reading mode and only the average data or the added data is stored.

The accumulation time Tx indicates an arbitrary accumulation time during the DC motor drive.

An example of a correction procedure of acquired shading data is shown below.

(1) Black shading data Dshd (x) at the time of the accumulation time Tshd is stored in the memory and the average data of Dshd (x) is stored in the memory, the register, or the like.

(2) White shading data Wshd (x) at the time of the accumulation time Tshd is stored in the memory and the average data of Wshd (x) is stored in the memory, the register, or the like.

(3) Average data Dmax_ave of black shading data Dmax (x) at the time of the accumulation time Tmax is stored in the memory, the register, or the like. The average data Dmax_ave is a value obtained by averaging the black shading data for each light-receiving pixel corresponding to the accumulation time Tmax.

(4) Average data Wmax_ave of white shading data Wmax (x) at the time of the accumulation time Tmax is stored in the memory, the register, or the like. The average data Wmax_ave is a value obtained by averaging the white shading data for each light-receiving pixel corresponding to the accumulation time Tmax.

(5) A function to obtain black shading data D' (x) corresponding to an arbitrary accumulation time is shown below.

$$D'(x)=Dshd(x)+(Dmax\_ave-Dshd\_ave)\times(Tx-Tshd)/(Tmax-Tshd)$$

That is, by a linear function derived from the value of each of Dshd (x), Dmax_ave, Tmax, and Tshd, corrected black shading data is obtained. By this D' (x), black shading data correction is performed uniformly for all the valid pixels with the average data.

(6) A function to obtain white shading data W' (x) corresponding to an arbitrary accumulation time is shown as below as in (5) described above.

$$W'(x)=Wshd(x)+(Wmax\_ave-Wshdave)\times(Tx-Ttyp)/(Tmax-Tshd)$$

By a linear function derived from the value of each of Wshd (x), Wmax_ave, Tmax_ave, and Tshd, corrected white shading data is obtained. By this W' (x), white shading data correction is performed uniformly for all the valid pixels with the average data.

As the calculation circuits in (5) and (6) described above, the case of a firmware configuration, a hardware configuration, or a mixed configuration of firmware/hardware is considered similarly. In the case of being stored in the memory in the compressed data format, correction calculation is performed by sequentially performing decoding.

Further, the correction of shading data is performed for all the valid pixels, but in general, the normal shading correction is also performed simultaneously with the black and white, black, or white correction data corrected for each pixel. However, processing procedures other than the above-described processing procedure are arbitrary and not limited, and therefore, explanation is omitted.

In the case where the linearity of data correction is limited to an arbitrary accumulation time interval as in the case in FIG. 5, it is sufficient to perform the same processing as that described above at a plurality of accumulation time intervals.

A unit is required, which is configured only to determine that, in the case where the accumulation time Tshd is taken to be Tn−1 and the accumulation time Tmax is taken to be Tn, the arbitrary accumulation time Tx exists between Tn−1 and Tn.

It may also be possible to configure the above-described configuration using the average data so as to correct input data. In this case, there is an advantage in that it is possible to configure the configuration only by adding a circuit without the need to change the shading block.

(7) Further, in the case where the above-described correction is valid only for the black shading data, it may also be possible to configure the correction procedure only by the processing in (1), (3), and (5) described above for the black shading data. That is, in the case where the data correction in the accumulation times in (1), (3), and (5) described above is only necessary for the correction of the black shading data, a correction amount ΔD of the accumulation time on the right side in the above-describe (5) shown below is subtracted from input data Vin.

$$\Delta D=(Dmax\_ave-Dshd\_ave)\times(Tx-Tshd)/(Tmax-Tshd)$$

(8) By subtracting ΔD from the input data Vin, it is possible to perform shading correction in the accumulation time, for example, as shown below. Here, the image reading signal output after the correction is taken to be Vout, the input signal of the read image data to be Vin, the correction coefficient to be Const, and the value for fine adjustment to be Offset.

$$Vout=Const*\{(Vin-\Delta D)-Dshd\}/(Wshd-Dshd)+Offset$$

By the above-described calculation method also, it is possible to similarly implement black shading correction in the accumulation time.

Figure 10:
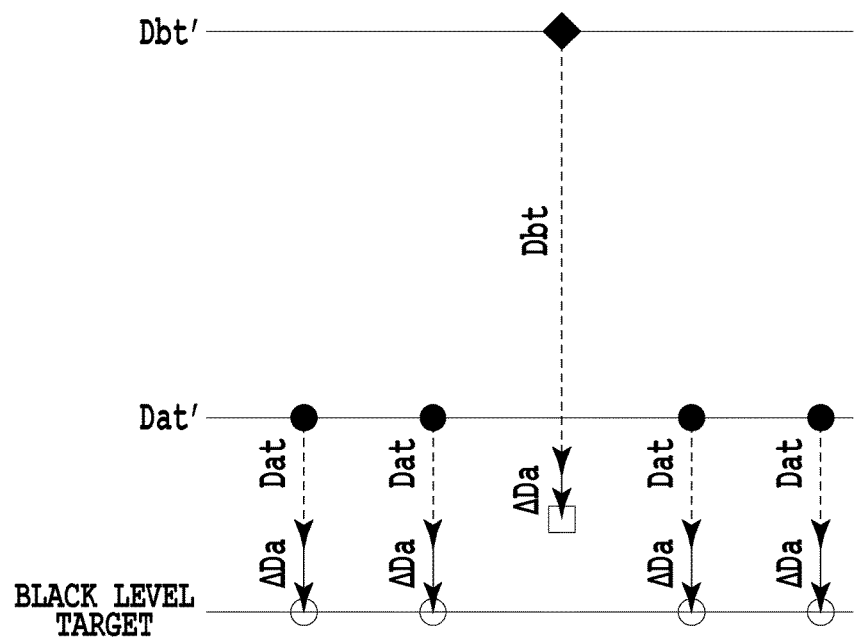
FIG. 10 is a diagram showing correction of black shading data in an accumulation time Ttyp+Δt in an embodiment of the present invention.

FIG. 10 shows the effect of the dark current correction. As shown I n FIG. 7, the acquisition of black shading data is performed in the case where the accumulation time Tshd is Ttyp. Consequently, (A) the black shading data due to a dark current that occurs averagely in all the pixels is Dat and (B) the black shading data due to a dark current that occurs in the singular pixel is Dbt. As shown in FIG. 5, in Rch, the accumulation time during a scan fluctuates in the range of Ttyp−Δt<Tx<Ttyp+Δt. FIG. 10 shows the correction on the line where the accumulation time Tx is Ttyp+Δt. In the case where the accumulation time Tx is Ttyp+Δt, (A) the black level data due to a dark current that occurs averagely in all the pixels is taken to be Dat' and (B) the black shading data due to a dark current that occurs in the singular pixel is taken to be Dbt'. Further, in the case where the correction amount ΔD of the black shading data on one line is taken to be ΔDa, ΔDa=Dat'−Dat. Consequently, (A) the dark current that occurs averagely in all the pixels:

$$Dat'-Dat-\Delta Da=0$$

(B) the dark current that occurs in the singular pixel:

$$Dbt'-Dbt-\Delta Da=3Dat'-3Dat-\Delta Da=2\Delta Da.$$

Similarly, in the case where the accumulation time Tx is Ttyp−Δt (not shown schematically), (A) the dark current that occurs averagely in all the pixels:

$$Dat'-Dat+\Delta Da=0$$

(B) the dark current that occurs in the singular pixel:

$$Dbt'-Dbt+\Delta Da=3Dat'-3Dat+\Delta Da=-2\Delta Da.$$

Consequently, on the line where cogging occurs, (A) the dark current that occurs averagely in all the pixels can be corrected, but (B) the dark current that occurs in the singular pixel cannot be corrected but $\pm 2\Delta Da$ is left. However, the singular pixel on the line where cogging occurs appears as an isolated point on the image and inconspicuous, and therefore, no problem arises.

Further, in Gch and Bch, the accumulation time Tx during a scan and the accumulation time Tshd at the time of black shading data acquisition are the same value (=Tmin), and therefore, the correction of the black shading data is not necessary (the correction amount $\Delta D$ of the black shading data is 0).

(9) Similarly, in the case where the above-described correction is valid only for the white shading data, it may also be possible to configure the correction procedure only by the processing in (2), (4), and (6) described above for the white shading data. That is, the correction amount $\Delta W$ of the accumulation time on the right side of the above-described (6) shown below is subtracted from the input data Vin.

$$\Delta W=(W\text{max\_ave}-W\text{shd\_ave})\times(Tx-T\text{shd})/(T\text{max}-T\text{shd})$$

(10) By subtracting the correction amount $\Delta W$ from the input data Vin, for example, it is possible to perform the shading correction in the accumulation time as shown below. Here, the image reading signal output after the correction is also taken to be Vout, the input signal of the read image data to be Vin, the correction coefficient to be Const, and the value for fine adjustment to be Offset.

$$V\text{out}=\text{Const}*\{(V\text{in}-\Delta W)-D\text{shd}\}/(W\text{shd}-D\text{shd})+\text{Offset}$$

By the above-described calculation method, it is also possible to implement the white shading correction in the accumulation time.

Further, by performing the processing using both black and white, it is also possible to implement the shading correction in the accumulation time.

As described above, the average value on the basis of each image sensor of the black and white shading data corresponding to two different accumulation times is acquired and the corrected black and white shading data corresponding to an arbitrary accumulation time is obtained by a linear function. Due to this, it is possible to appropriately correct read image data by applying shading data appropriate for the accumulation time.

Figure 11:
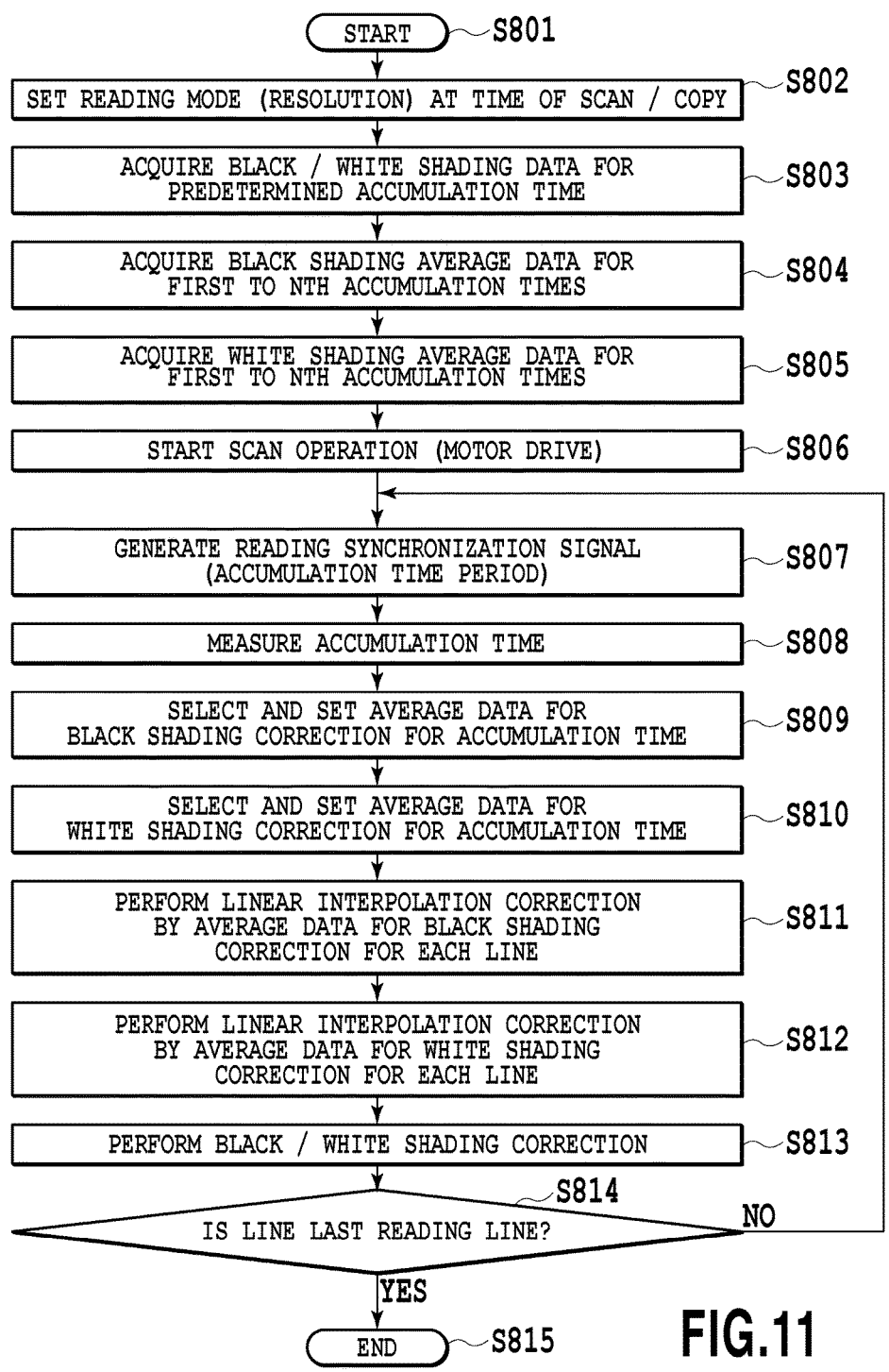
FIG. 11 is a flowchart showing shading data correction by average data for each line of black and white shading data in an embodiment of the present invention.

FIG. 11 is a flowchart showing an example of shading data correction by a linear interpolation method with average data for each line of black and white shading data in the present embodiment.

First, at step S801, the image reading apparatus starts the copy or scan operation by a user operating an operation key. At step S802, the image reading apparatus sets the selected reading mode (resolution) at the time of a scan/copy. At step S803, the image reading apparatus acquires black and white, black, or white shading data for a reference predetermined accumulation time. Following this, at step S804, the image reading apparatus acquires the average value of the black shading data for first (e.g., in the case of the above-described reference) and second accumulation times. Further, in the case where shading data corresponding to a plurality of accumulation times is necessary, the image reading apparatus acquires the average value of black shading data for the accumulation times up to the Nth accumulation time. For example, the image reading apparatus acquires the average value of shading data for the accumulation times in the order from the shortest accumulation time (T1<T2<T3< ... <Tn). Next, at step S805, the image reading apparatus also acquires a plurality of pieces of white shading data as in the case of the black shading at step S804.

Following this, at step S806, the image reading apparatus moves into the scan operation and starts DC motor drive. In the case where the motor drive is started, at step S807, the image reading apparatus generates a reading synchronization signal with a number of pulses set in advance by the encoder signal as shown in FIG. 5. The reading synchronization signal has the accumulation time period and inputting of a drive signal and data to the image sensor is started. At step S808, the image reading apparatus measures the reading synchronization signal for each line, or for each single color line, such as the LED, in the case of the CIS system, and stores the accumulation time in the internal register or the memory. Following this, at step S809, the image reading apparatus sets the average value of the black shading data for the first and second accumulation times so that the average value can be read from the register, the memory, or the like and reads the reference black shading data for each pixel. Further, in the case where a plurality of pieces of black shading data is necessary, the image reading apparatus determines which accumulation time an accumulation time belongs to and sets the average value of the black shading data for the previous and next accumulation times so that the average value can be read from the register, the memory, or the like. Then, the image reading apparatus reads the average value of the black shading data at the two selected and set points and the reference black shading data for each pixel. At step S810, the image reading apparatus also selects and sets the average value of the white shading data as in the case of the black shading data at step S809.

Following this, at step S811, the image reading apparatus linearly interpolates the black shading data for each line in accordance with the above-described correction procedure of the shading data. At step S812, the image reading apparatus also linearly interpolates the white shading data as in the case of the black shading data at step S811. Following this, at step S813, the image reading apparatus performs shading correction in accordance with the correction procedure of the shading data in (1) to (6) described above. The correction value is acquired for each line and the correction is performed for all the valid pixels based on the reference shading data. Following this, at step S814, the image reading apparatus determines whether the line is the last reading line. In the case where the line is not the last reading line (No), the processing returns to step S807 and the generation of the reading synchronization signal of the next line and the measurement of the accumulation time are repeated. In the case where the line is the last reading line (Yes), at step S815, the image reading apparatus terminates the copy/scan operation.

Further, as described above, it is also possible to configure the image reading apparatus in an embodiment of the present invention so as to correct input data in place of shading data.

Figure 12:
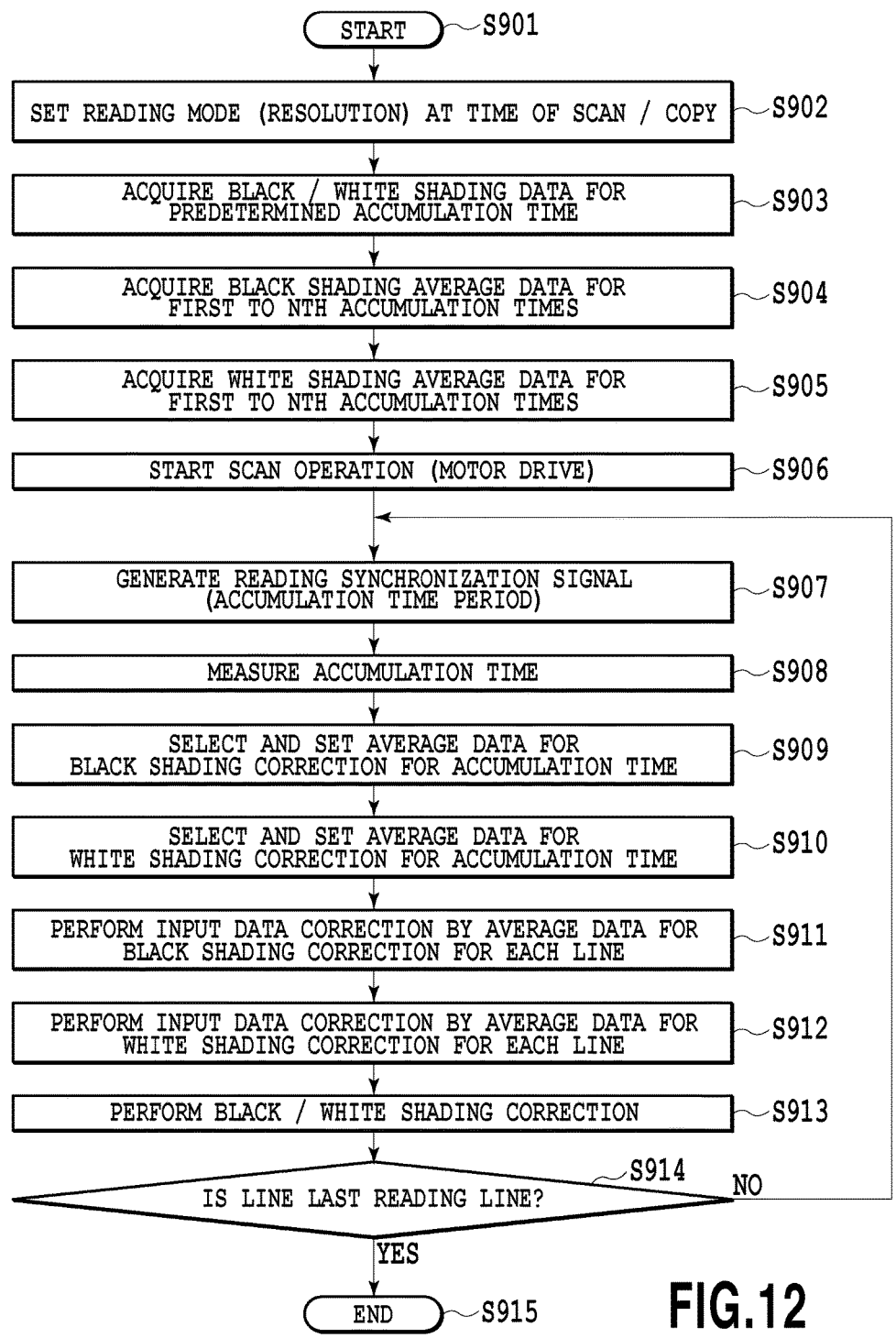
FIG. 12 is a flowchart showing input data correction by average data for each line of black and white shading data in an embodiment of the present invention.

FIG. 12 is a flowchart showing correction of linearly interpolated input data by the average data for each line of black and white shading data in an embodiment of the present invention.

First, at step S901, the image reading apparatus starts the copy or scan operation by a user operating an operation key. At step S902, the image reading apparatus sets the selected reading mode (resolution) at the time of a scan/copy. At step S903, the image reading apparatus acquires black and white, black, or white shading data for a reference predetermined accumulation time. Following this, at step S904, the image reading apparatus acquires the average value of the black shading data for the first (e.g., in the case of the above-described reference) and second accumulation times. Further, in the case where shading data for a plurality of accumulation times is necessary, the image reading apparatus acquires the average value of black shading data for the accumulation times up to the Nth accumulation time. For example, the average value of shading data for the accumulation times in the order from the shortest accumulation time ($T1<T2<T3<\ldots<Tn$) is acquired. Next, at step S905, the image reading apparatus also acquires a plurality of pieces of white shading data as in the case of the black shading data at step S904.

Following this, at step S906, the image reading apparatus starts the DC motor drive of the scan operation. In the case where the motor drive is started, at step S907, the image reading apparatus generates a reading synchronization signal with a number of pulses set in advance by the encoder signal as shown in FIG. 5. The reading synchronization signal has the accumulation time period and inputting of a drive signal and data to the image sensor is started. At step S908, the image reading apparatus measures the reading synchronization signal for each line, or for each single color line, such as the LED, in the case of the CIS system, and stores the accumulation time in the internal register or the memory. Following this, at step S909, the image reading apparatus sets the average value of the black shading data for the first and second accumulation times so that the average value can be read from the register, the memory, or the like and reads the reference black shading data for each pixel. Further, in the case where a plurality of pieces of black shading data is necessary, which accumulation time an accumulation time belongs to is determined and the average value of the black shading data for the previous and next accumulation times is set so that the average value can be read from the register, the memory, or the like. Then, the image reading apparatus reads the average value of the black shading data at the two selected and set points and the reference black shading data for each pixel. Next, at step S910, the image reading apparatus also selects and sets the average value of the white shading data as in the case of the black shading data at step S909.

Following this, at step S911, the image reading apparatus corrects input data corresponding to that linearly interpolated of the black shading data for each line in accordance with the correction procedure of the shading data in (1) to (4) and (7) to (10) described above. At step S912, the image reading apparatus also corrects the input data corresponding to that linearly interpolated of the white shading data as in the case of the black shading data at step S911. The correction value is acquired for each line and the data correction is performed for the input data. After this, at step S913, the image reading apparatus performs, for example, the shading correction described previously. Following this, at step S914, the image reading apparatus determines whether the line is the last reading line and in the case where the line is not the last reading line (No), the processing returns to step S907 and the generation of the reading synchronization signal of the next line and the measurement of the accumulation time are repeated. On the other hand, in the case where the line is the last reading line (Yes), at step S915, the image reading apparatus terminates the copy/scan operation.

With reference to FIG. 13A and FIG. 13B, the effect of the black shading correction according to the present invention is explained in comparison with the conventional technique (technique described in Japanese Patent No. 4892447). FIG. 13A and FIG. 13B each show an image obtained by scanning black shading data and black data in the target accumulation time Ttyp in the channel where the accumulation time fluctuates. The tone curve correction has been performed for the image in order to make the image easy-to-see on the sheet.

FIG. 13A shows the correction for each line in the conventional technique (technique described in Japanese Patent No. 4892447) and the black shading data is the same as that in FIG. 2. FIG. 13B shows the correction for each line according to the present invention and the black shading data is the same as that in FIG. 8. In FIG. 13A, (A) the dark current that occurs averagely in all the pixels can be corrected, but (B) the dark current that occurs in the singular pixel cannot be corrected but $2\Delta Da$ is left. Because of this, the vertical streak appears in the image. On the other hand, in FIG. 13B, in the accumulation time Ttyp, both (A) the dark current that occurs averagely in all the pixels and (B) the dark current that occurs in the singular pixel can be corrected. Because of this, no vertical streak appears in the image.

As explained above, in the present invention, black shading data is acquired in the accumulation time corresponding to the accumulation period that is affected by the fluctuations in the speed due to the DC motor. Further, for the black level or white level data, the correction method of the shading data by linear interpolation is selected for each line in accordance with the necessity and the methods are combined. Due to this, in the image reading apparatus in synchronization with the encoder of the DC motor, it is possible to optimally correct the dark current component and data fluctuations of the image sensor for an arbitrary accumulation time. Further, it is also possible to apply the shading correction according to the present invention to an image reading apparatus including a pulse motor as a drive source.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment (s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, it is possible to obtain an appropriate shading correction value for the change in (A) the dark current that occurs averagely in all the pixels and (B) the dark current that occurs in the singular pixel without requiring a large amount of memory or much processing time.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-113487, filed Jun. 7, 2016, which is hereby incorporated by reference wherein in its entirety.

What is claimed is:

1. An image reading apparatus comprising:
an image sensor to read a document;
a movement unit configured to relatively move the document and the image sensor by using a motor as a drive source;
an output unit configured to output data of a plurality of colors based on accumulated light-receiving signals by accumulating the light-receiving signals from the image sensor for each color in order for each line in a direction of the movement based on an encoder pulse output from an encoder in accordance with rotation of the motor; and
a correction unit configured to perform shading correction for each piece of data of the plurality of colors output by the output unit by using a correction value to correct influence on data of the plurality of colors due to a dark current in the image sensor based on shading data, wherein
the output unit accumulates the light-receiving signal for predetermined color of the plurality of colors from timing based on the encoder pulse until end timing determined asynchronously with the encoder pulse so that an accumulation time becomes a predetermined time, and accumulates the light-receiving signals for other color different from the predetermined color of the plurality of colors from start timing based on the encoder pulse until end timing determined in synchronization with the encoder pulse, and
the correction unit corrects data of the predetermined color and data of the other color independently of each other and performs correction of data of the other color by using a correction value corresponding to the end timing determined in synchronization with the encoder pulse.

2. The image reading apparatus according to claim 1, wherein
the correction unit performs correction for each light-receiving pixel by using a correction value for each of the light-receiving pixels that the image sensor has.

3. The image reading apparatus according to claim 2, wherein
the correction unit performs, as the shading correction for the other color, primary correction that applies a different correction value to each pixel of the image sensor and secondary correction that applies the same correction value to each pixel of the image sensor in accordance with the encoder pulse.

4. The image reading apparatus according to claim 1, wherein
the correction unit:
generates a calibration curve from shading data acquired in at least two or more accumulation times;
obtains an amount of fluctuations in an accumulation time with an accumulation time corresponding to a predetermined motor speed as a reference; and
calculates the correction value for the other color based on fluctuations in shading data for the amount of fluctuations in the accumulation time.

5. The image reading apparatus according to claim 1, wherein
the correction value is calculated by average data of a plurality of light-receiving pixels that the image sensor has.

6. The image reading apparatus according to claim 1, wherein
the output unit accumulates the light-receiving pixels of the predetermined color from timing based on the encoder pulse until end timing determined by a count of an internal timer that the output unit has so that the accumulation time becomes a predetermined time.

7. The image reading apparatus according to claim 1, wherein the shading data is black shading data.

8. The image reading apparatus according to claim 1, wherein the shading data is white shading data.

9. The image reading apparatus according to claim 1, wherein the motor is a DC motor.

10. The image reading apparatus according to claim 1, wherein the motor is a pulse motor.

11. The image reading apparatus according to claim 1, wherein
the image sensor reads the document by emitting light while sequentially switching a plurality of colors including at least the predetermined color and the other color for each of the lines of the document and by receiving reflected light from the document.

12. An image reading method performed by an image reading apparatus that reads a document by relatively moving an image sensor and the document by using a motor as a drive source, the method comprising the steps of:
outputting data of a plurality of colors based on accumulated light-receiving signals by accumulating the light-receiving signals from the image sensor for each color in order for each line in a direction of the movement based on an encoder pulse output from an encoder in accordance with rotation of the motor; and
performing shading correction for each piece of output data of the plurality of colors by using a correction value to correct influence on data of the plurality of colors due to a dark current in the image sensor based on shading data, wherein
the light-receiving signals are accumulated for predetermined color of the plurality of colors from timing based on the encoder pulse until end timing determined asynchronously with the encoder pulse so that an accumulation time becomes a predetermined time, and the light-receiving signals are accumulated for other color different from the predetermined color of the plurality of colors from start timing based on the encoder pulse until end timing determined in synchronization with the encoder pulse, and
data of the predetermined color and data of the other color are corrected independently of each other and correction of data of the other color is performed by using a correction value corresponding to the end timing determined in synchronization with the encoder pulse.

13. The image reading method according to claim 12, wherein
correction for each light-receiving pixel is performed by using a correction value for each of the light-receiving pixels that the image sensor has.

14. The image reading method according to claim 13, wherein
as the shading correction for the other color, primary correction that applies a different correction value to each pixel of the image sensor and secondary correction that applies the same correction value to each pixel of the image sensor in accordance with the encoder pulse are performed.

15. The image reading method according to claim 12, wherein
a calibration curve is generated from shading data acquired in at least two or more accumulation times,
an amount of fluctuations in an accumulation time with an accumulation time corresponding to a predetermined motor speed as a reference is obtained, and
the correction value for the other color is calculated based on fluctuations in shading data for the amount of fluctuations in the accumulation time.

16. The image reading method according to claim 12, wherein
the correction value is calculated by average data of a plurality of light-receiving pixels that the image sensor has.

17. The image reading method according to claim 12, wherein
the light-receiving pixels of the predetermined color are accumulated from timing based on the encoder pulse until end timing determined by a count of an internal timer that the output unit has so that the accumulation time becomes a predetermined time.

18. The image reading method according to claim 12, wherein
the image sensor reads the document by emitting light while sequentially switching a plurality of colors including at least the predetermined color and the other color for each of the lines of the document and by receiving reflected light from the document.

19. A non-transitory computer readable storage medium storing a program for causing a computer to perform an image reading method of reading a document by relatively moving an image sensor and the document by using a motor as a drive source, the method comprising the steps of:
outputting data of a plurality of colors based on accumulated light-receiving signals by accumulating the light-receiving signals from the image sensor for each color in order for each line in a direction of the movement based on an encoder pulse output from an encoder in accordance with rotation of the motor; and
performing shading correction for each piece of output data of the plurality of colors by using a correction value to correct influence on data of the plurality of colors due to a dark current in the image sensor based on shading data, wherein
the light-receiving signals are accumulated for predetermined color of the plurality of colors from timing based on the encoder pulse until end timing determined asynchronously with the encoder pulse so that an accumulation time becomes a predetermined time, and
the light-receiving signals are accumulated for the other color different from the predetermined color of the plurality of colors from start timing based on the encoder pulse until end timing determined in synchronization with the encoder pulse, and
data of the predetermined color and data of the other color are corrected independently of each other and correction of data of the other color is performed by using a correction value in accordance with the encoder pulse.

* * * * *